Patented Nov. 26, 1929

1,737,279

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

CEREAL EXTRACT AND PROCESS OF MAKING SAME

No Drawing.      Application filed April 3, 1923. Serial No. 629,704.

This invention relates to a new class of cereal extracts and to processes of making the same. The object of the invention, broadly considered, is to produce a liquid extract, suitable for the uses to which the prior cereal extracts have been put, and having a high content of vitamine B. A further object of the invention is to provide such an extract, which also will have a relatively high content of water soluble proteins.

A still further object of the invention is to provide an extract suitable for the production of a beverage resembling beer but of low alcoholic content.

With these objects in view, the invention comprises the extracts and processes of making and utilizing the same which will be described in detail and then more particularly pointed out.

In carrying out a process embodying the invention, the starting material comprises a malt or its equivalent and a raw material especially rich in vitamine B, such, for example, as a raw material containing a substantial proportion of cereal germs, and in this specification the term cereal germ will be understood to mean the embryo of the grain. While there are several kinds of cereal germ material which may be employed because of their high content of vitamine B, it has been found that for the purposes of this invention the raw material which comprises principally the germs of wheat removed in the usual milling processes is particularly advantageous. Any suitable malt may be employed, but in the best practice of the invention, a good barley or wheat malt gives the best results. From a mixture of malt and cereal germs a wort is prepared and this wort forms the desired extract, which may be concentrated, as by evaporation, if desired.

To prepare the wort, the cereal germ material and malt may be used in various proportions. For many purposes the amount of malt may be much less than the amount of cereal germ material. If, for example, the cereal germ material which sometimes is loosely called middlings or germs be employed the proportions may be 80 parts of such middlings to 20 parts of malt. An efficient method of procedure is to use only half the quantity of malt with such middlings at first and the rest of the malt may then be added later. For example, all the said middlings and half the malt are mashed with sufficient water to form a mash of the consistency usual in making a mash in the well known way. The temperature of the mash may well be about 70° to 75° C. The temperature is then raised somewhat, for example, to about 80° C and held at this temperature until the diastase in the malt begins to liquefy and convert the starch. Usually this will occur in less than half an hour.

The mash is then heated to the boiling point and boiled for a short time, say, for example, a few minutes and preferably not more than ten minutes. While this boiling step may be omitted it has been found to be advantageous in that it assists the subsequent conversion of the mash. After boiling, the mash is cooled to the proper temperature and the remainder of the malt added to the mash and well stirred in. The temperature to which the mash is cooled will determine the relative percentage of maltose and dextrine contained in the final product.

If it is desired to produce an extract high in maltose the mash is cooled to about 60° C. before adding the remainder of the malt. The extract thus obtained may be fermented to make a beverage which will have a relatively high alcoholic content and then may be treated to free it of most of such alcohol, as will be fully understood by those skilled in the art.

If the mash be cooled only to about 75° to 76° C. before adding the additional malt, the resultant extract will be rich in dextrines. Such an extract is particularly suitable for fermentation to produce a beverage low in alcohol resembling the so-called near beers, and, therefore, generally not requiring any treatment for the removal of alcohol.

At the time the additional malt is added it may be necessary to adjust the hydrogen ion concentration of the mash, because frequently this is not always most favorable for the diastatic action. That is, the acidity of mashes made with such middlings varies with the composition of such middlings, and hence, at times it is necessary to add a small amount of a suitable acid to bring up the acidity to a point favorable for diastatic conversion. For example, phosphoric, lactic, tartaric or other suitable acid may be used for this purpose. A simple preliminary mashing test will demonstrate whether or not it will be necessary to add any acid and if so in what quantities.

After saccharification, the wort is separated from the brewer's grains or dregs in any suitable way, as for example, by filtration. The filtrate constitutes a fluid extract embodying one part of the invention. This extract is suitable for use at once in the preparation of a beverage, in which case the fluid extract is finished in the manner customary heretofore with the usual malt worts. The finishing steps may include the use of hops and yeast and suitable fermentation.

Where the extract is to be kept or transported, or is to be used for purposes other than the manufacture of beverages it may be concentrated, as for example, by evaporation to a thick extract usually of about 40° to 42° Bé. which is similar in appearance to the ordinary malt extract. The new extract in this concentrated form has good stability and is in convenient form for manufacturers to use. If it is to be made into beverages, it may be diluted and then finished in any of the usual ways for the manufacture of malt beverages.

The thin fluid extract may be concentrated to solid form, as for example, by spray drying, or in any other suitable way. In this form it has especially good keeping qualities and is adapted not only for the manufacture of beverages, but also as an adjunct to wheat or rye flour, since it increases the vitamine content of such flours, stimulates the yeast, and makes a better loaf. When preparing extracts for this purpose, the starting materials may be wheat germs and wheat malt. The fluid extract so made may then be concentrated to solid form as described above and combined with wheat flours.

By a suitable carrying out of the process a product containing active diastase is readily obtained, and may be employed whenever this diastatic action is desired. Or the extract in solid form, if low in active diastase may be blended with preparations containing active diastase.

An extract made as described hereinbefore is extremely rich in vitamines, and particularly the water soluble vitamine B, and has the great advantage that it can be produced economically.

The beverages made from the new extract by the usual methods of making malt beverages will retain a large proportion of the vitamines and particularly vitamine B found in the extract and hence will have an enhanced dietetic value for this reason.

The presence of the vitamine B in the extracts, both fluid and concentrated, and in the beverage or other product made therefrom may be determined by the tests already known for determining the presence of vitamine B.

The extracts made from raw materials containing chiefly cereal germs not only are rich in vitamine B but also contain a considerable proportion of proteins. A percentage of these proteins contained in the cereal germs and in the malt will be in a water-insoluble form and hence non-available. Therefore to enhance the value of the extracts and the beverages made therefrom, it is advantageous to modify the process of making the extract in such a way as to proteolyze a substantial amount of the water-insoluble proteins contained in the starting materials. Such proteolysis is best brought about by the aid of a suitable proteolytic enzyme. The enzyme may be added at a suitable time in the mashing process either before or after saccharification of the mash but in any case before filtration of the wort. The amount of enzyme to be added depends upon the kind of enzyme, the activity of the preparation employed and the length of time allowed for the proteolytic action. In practice, it has been found best to employ either pepsin or papain.

A commercial preparation of either pepsin or papain will be suitable for the purpose intended, and may be added in suitable quantities to the mash. While the proportions may vary considerably, it has been found that an addition of about 1% by weight of the commercial preparation, figured on the total amount of starting material will be ample to accomplish the desired proteolysis within a reasonable time. While the action of the enzyme can take place at various temperatures, it has been found in practice that a temperature of the mash of about 60° C. is very suitable. The time of action varies with the activity of the preparation used and the amount of water insoluble proteins which it is desired to make water-soluble. In fact, the time can range from about one hour to 36 hours, or even longer. In practice, however, with the normal commercial preparations, and when the mash is retained at about 60° C., about 24 hours will be ample for this action. Before adding the enzyme it will be advisable to adjust the hydrogen ion concentration of the mash, that is to say, to make certain that the mash has the proper degrees of acidity for the particular enzyme. For example, when using pepsin the mash must be sufficiently acid for the proper action of the enzyme, as is well known to those skilled in the art. If papain is the enzyme employed the mash should not be too acid, and in fact is best when very slightly acid to litmus.

The mash may be given the desired acidity by the addition of any suitable acids, or if too acid may be neutralized to the desired extent by any suitable reagent such as sodium carbonate or calcium carbonate.

When pepsin is the enzyme used any excess acid left in the wort after proteolysis may need to be neutralized and this may be accomplished by the addition of the proper neutralizing agent. For instance, if the acidity is due to a previous addition of hydrochloric acid, bicarbonate of soda may be used. If the acidity is due to a previous addition of phosphoric or sulphuric acid, the neutralizing agent may be calcium carbonate.

The solids of an extract made as above explained will contain approximately 15 to 20 percent of water-soluble proteins, so that the extract and any beverage made therefrom not only will be rich in vitamine B but also will have an exceedingly high food value on account of the proteins.

What I claim is:

1. The process of making extracts resembling cereal extracts and having a high content of vitamine B, which comprises making an aqueous mash comprising malt and a material consisting chiefly of wheat germs, allowing the mash to undergo saccharification by the malt, and finally separating the liquid extract from the solids.

2. The process of making extracts resembling cereal extracts and having a high content of vitamine B, which comprises making an aqueous mash comprising malt and a material consisting chiefly of wheat germs, allowing the mash to undergo saccharification by the malt, separating the liquid extract from the solids, and then concentrating the fluid extract.

3. The process of making an extract resembling cereal extracts and having a high content of vitamine B, which comprises making an aqueous mash comprising malt and a material consisting chiefly of cereal germs, boiling the mash, cooling to about 75 to 76° C., adding additional malt thereto, allowing the mash to undergo saccharification by the malt, and then filtering off the fluid extract from the solids.

4. The process of making an extract resembling cereal extracts and having a high content of vitamine B, which comprises making an aqueous mash comprising malt and a material consisting chiefly of cereal germs, boiling the mash, cooling to about 75 to 76° C., acidifying the mash, adding additional malt thereto, allowing the mash to undergo saccharification by the malt, and then filtering off the fluid extract from the solids.

5. The process of making extracts resembling cereal extracts and having a high content of vitamine B, which comprises making an aqueous mash comprising malt and a material consisting chiefly of wheat germs, subjecting the mash to the action of a proteolytic enzyme whereby water-insoluble proteins are rendered water soluble, separating the fluid extract from the solids, and concentrating the fluid extract.

6. The process of making extracts resembling cereal extracts and having a high content of vitamine B, which comprises making an aqueous mash comprising malt and material consisting chiefly of wheat germs, subjecting the mash to the action of a proteolytic enzyme, whereby water insoluble proteins are rendered water-soluble, allowing the mash to undergo saccharification by the malt, and then separating the fluid extract from the solids.

7. The process of making extracts resembling cereal extracts and having a high content of vitamine B, which comprises making an aqueous mash comprising malt and material consisting chiefly of wheat germs, subjecting the mash to the action of a protelytic enzyme, whereby water insoluble proteins are rendered water-soluble, allowing the mash to undergo saccharification by the malt, separating the fluid extract from the solids, and then concentrating the fluid extract.

8. The process of making extracts resembling cereal extracts and having a high content of soluble proteins and vitamine B, which comprises making an aqueous mash comprising malt and material consisting chiefly of wheat germs, allowing the mash to undergo saccharification by the malt, subjecting the mash to the action of a proteolytic enzyme and maintaining it under protelyzing conditions, and separating the fluid extract from the solids.

9. The process of making an extract resembling cereal extracts and having a high content of vitamine B, which comprises making an aqueous mash comprising malt and a material consisting chiefly of wheat germs, boiling the mash, cooling to above 60° C., adding additional malt thereto, allowing the mash to undergo saccharification by the malt, and then separating the fluid extract from the solids.

In testimony whereof, I have hereunto set my hand.

LEO WALLERSTEIN.